US006309453B1

(12) United States Patent
Banning et al.

(10) Patent No.: US 6,309,453 B1
(45) Date of Patent: Oct. 30, 2001

(54) COLORLESS COMPOUNDS, SOLID INKS, AND PRINTING METHODS

(75) Inventors: Jeffrey H. Banning, Hillsboro; Donald R. Titterington; Wolfgang G. Wedler, both of Tualatin, all of OR (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/400,127

(22) Filed: Sep. 20, 1999

(51) Int. Cl.$^7$ .................................................. C09D 11/00
(52) U.S. Cl. ............................... 106/31.29; 106/31.61; 106/31.43; 106/31.75; 106/31.58; 106/31.86
(58) Field of Search ........................... 106/31.29, 31.43, 106/31.58, 31.61, 31.75, 31.86

(56) References Cited

U.S. PATENT DOCUMENTS

| | | |
|---|---|---|
| 2,409,712 | 10/1946 | Schweitzer et al. . |
| 3,012,991 | 12/1961 | Schultheis et al. . |
| 3,384,623 | 5/1968 | Inone et al. . |
| 3,425,973 | 2/1969 | Shaw et al. . |
| 3,653,932 | 4/1972 | Berry et al. . |
| 3,963,710 | 6/1976 | Aufdermarsh, Jr. . |
| 4,011,311 | 3/1977 | Noomen et al. . |
| 4,080,314 | 3/1978 | Bonk et al. . |
| 4,293,470 | 10/1981 | Cuscurida . |
| 4,297,501 | 10/1981 | Becker et al. . |
| 4,334,032 | 6/1982 | Patton, Jr. et al. . |
| 4,334,052 | 6/1982 | Patton, Jr. et al. . |
| 4,381,403 | 4/1983 | Falcone et al. . |
| 4,390,369 | 6/1983 | Merritt et al. . |
| 4,484,948 | 11/1984 | Merritt et al. . |
| 4,501,915 | 2/1985 | McCoy . |
| 4,537,960 | 8/1985 | Merger et al. . |
| 4,574,147 | 3/1986 | Meckel . |
| 4,665,146 | 5/1987 | Tortorello et al. . |
| 4,684,956 | 8/1987 | Ball . |
| 4,810,820 | 3/1989 | Slack et al. . |
| 4,846,846 | 7/1989 | Reckers et al. . |
| 4,851,045 | 7/1989 | Taniguchi . |
| 4,889,560 | 12/1989 | Jaeger et al. . |
| 4,889,761 | 12/1989 | Titterington et al. . |
| 5,006,170 | 4/1991 | Schwarz et al. . |
| 5,151,120 | 9/1992 | You et al. . |
| 5,195,430 | 3/1993 | Rise . |
| 5,221,335 | 6/1993 | Williams et al. . |
| 5,231,135 | 7/1993 | Machell et al. . |
| 5,278,223 | 1/1994 | Gruenewaelder et al. . |
| 5,372,852 | 12/1994 | Titterington et al. . |
| 5,389,720 | 2/1995 | Markusch et al. . |
| 5,389,958 | 2/1995 | Bui et al. . |
| 5,496,879 | 3/1996 | Griebel et al. . |
| 5,554,212 * | 9/1996 | Bui et al. .......................... 106/31.36 |
| 5,621,022 | 4/1997 | Jaeger et al. . |
| 5,624,483 | 4/1997 | Fujoika . |
| 5,750,604 | 5/1998 | Banning et al. . |
| 5,817,860 | 10/1998 | Rizk et al. . |
| 5,837,044 | 11/1998 | Santilli et al. . |
| 5,919,839 | 7/1999 | Titterington et al. . |

FOREIGN PATENT DOCUMENTS

| | | |
|---|---|---|
| 4205636A1 | 2/1992 | (DE) . |
| 4205713A1 | 2/1992 | (DE) . |
| 0187352 | 12/1985 | (EP) . |
| 0206286 | 6/1986 | (EP) . |
| WO 94/04619 | 3/1994 | (WO) . |
| WO 94/14902 | 7/1994 | (WO) . |
| WO 97/12003 | 4/1997 | (WO) . |
| WO 97/13816 | 4/1997 | (WO) . |

OTHER PUBLICATIONS

"Polymer Chemistry—The Basic Concepts" by Paul C. Hiemenz, California State Polytechnic University, Pomona, California, p. 7, no date available.
"Technical Product Information" Luxate Isophorone Diisocyanate, by Olin Chemicals, Olin Corporation, 2 pages, no date available.
"Advanced Organic Chemistry", Reactions, Mechanisms, and Structure, Third Edition, by Jerry March, Professor of Chemistry, Adelphi University, 6 pages, no date available.

* cited by examiner

Primary Examiner—Helene Klemanski
Assistant Examiner—Veronica F. Faison
(74) Attorney, Agent, or Firm—Wells, St. John, Roberts, Gregory & Matkin

(57) ABSTRACT

The invention includes colorless compounds having a central core and at least two arms extending from the core. The core can comprise one or more atoms. The at least two arms have the formula

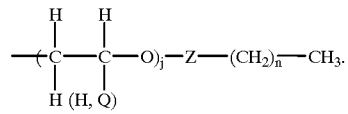

In such formula, Z is a segment of one or more atoms; j is an integer from 1 to about 300 and can be different at one of the at least two arms than at another of the at least two arms; Q is an alkyl or aryl group and can vary amongst different alkyl and aryl groups within the colorless compound; and n is an integer greater than 1 and can be different at one of the at least two arms than at another of the at least two arms. In other aspects, the invention encompasses phase change inks incorporating the above-described colorless compound as toughening agent, and methods of printing with such phase change inks. The invention further includes a solid ink comprising a colorant and a colorless compound of the formula

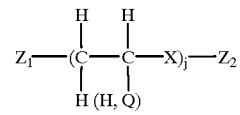

In such formula, X is a single atom corresponding to N or O; $Z_1$ and $Z_2$ are substituents comprising one or more atoms, and can be the same as one another or different from one another; and j is an integer from 1 to about 50.

31 Claims, 1 Drawing Sheet

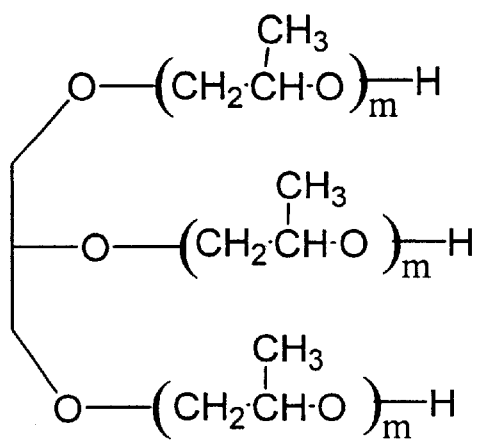
1. Dibutyltindilaurate (catalyst)
2. $CH_3(CH_2)_n\text{-}NCO$
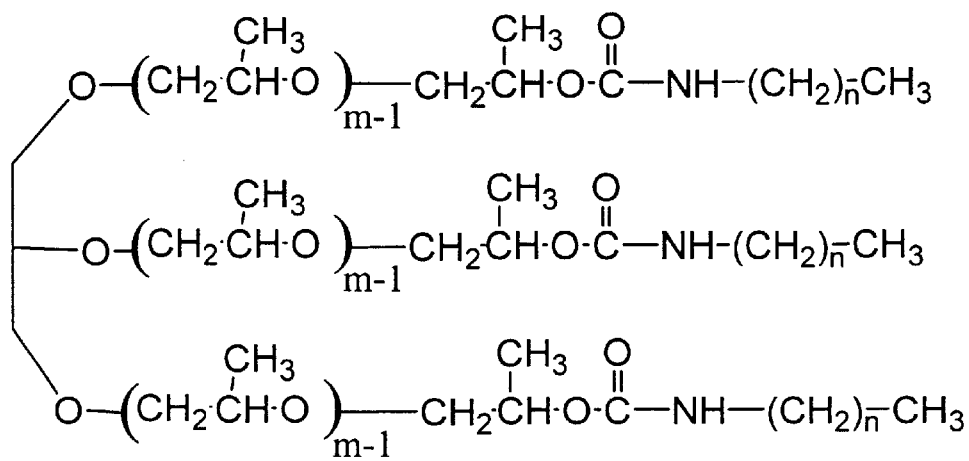

COLORLESS COMPOUNDS, SOLID INKS, AND PRINTING METHODS

BACKGROUND OF THE INVENTION

1. Field of the Invention

The present invention relates to phase change inks and encompasses new colorless compounds which can be utilized as toughening agents in phase change inks. The invention also encompasses solid phase change inks having the colorless compounds incorporated therein, and printing methods utilizing the phase change inks.

2. Description of the Relevant Art

The present invention encompasses new toughening compounds, routes to their preparation, and methodology for incorporating such compounds into phase change inks. Phase change inks are compositions which are in a solid phase at ambient temperature, but which exist in a liquid phase in an elevated operating temperature of an ink jet printing device. At the jet operating temperature, droplets of liquid ink are ejected from the printing device. When the ink droplets contact the surface of a printing media, they solidify to form a printed pattern. Phase change ink methodology is described generally in U.S. Pat. Nos. 4,889,560; 5,372,852; 5,827,918 and 5,919,839.

A difficulty associated with phase change inks can occur in automated document feed applications. Specifically, a substrate (such as, for example, paper) coated with a phase change ink can be difficult to utilize in automated document feed applications. The difficulty can occur if a coefficient of friction of the printed phase change ink is high enough to impede flow of the printed document through automated document feed systems, and can lead to document misfeeding.

Additional difficulties that can occur with printed phase change inks result from the inks occasionally being too brittle, and accordingly lacking durability. If the inks are too brittle and are printed as an image on a flexible substrate, the printed inks can break when the substrate is bent. Such breakage can reduce a quality of the printed image.

It is often difficult to find a suitable ink composition which will have both appropriate durability and coefficient of friction. Frequently, modifications which improve ink suitability in automated document feed mechanisms (i.e., which reduce ink coefficient of friction) also decrease ink durability.

A general class of compounds developed for reducing some or all of the above-described difficulties are so-called toughening agents. Toughening agents are materials which can be incorporated into a phase change ink (i.e., utilized as an additive to the ink), and which improve durability of the printed ink to bending. The most ideal toughening agents not only improve the durability of the ink to bending, but do so without increasing a coefficient of friction of the ink relative to the coefficient of friction which would exist without the toughening agent.

It would be desirable to develop additional toughening agents which could be utilized in phase change inks for improving durability of the inks, and which preferably would not increase coefficient of frictions associated with the inks.

BRIEF SUMMARY OF THE INVENTION

In one aspect, the invention encompasses a colorless compound comprising a central core and at least two arms extending from the core. The core can comprise one or more atoms. The at least two arms have the formula

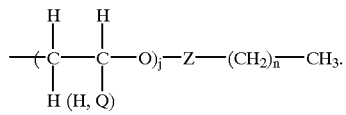

In such formula, Z is a segment of one or more atoms; j is an integer from 1 to about 300 and can be different at one of the at least two arms than at another of the at least two arms; Q is an alkyl or aryl group and can vary amongst different alkyl and aryl groups within the colorless compound; and n is an integer greater than 1 and can be different at one of the at least two arms than at another of the at least two arms. In other aspects, the invention encompasses phase change inks incorporating the above-described colorless compound as a toughening agent, and methods of printing with such phase change inks.

In another aspect, the invention encompasses a solid ink comprising a colorant and a colorless compound of the formula

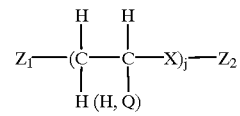

In such formula, X is a single atom corresponding to N or O; $Z_1$ and $Z_2$ are substituents comprising one or more atoms, and can be the same as one another or different from one another; j is an integer from 1 to about 50; and the representation of "(H, Q)" indicates that either a group Q or a hydrogen can be in the shown positions. The group Q is either an alkyl group or an aryl group, and can vary amongst different alkyl and aryl groups within the compound.

BRIEF DESCRIPTION OF THE DRAWING

The FIGURE shows a reaction scheme for forming a toughening agent encompassed by the present invention.

DESCRIPTION OF THE PREFERRED EMBODIMENTS

In accordance with the present invention, it has been found that toughening agents having the general formula 1 can be suitable for improving durability of phase change inks.

1.

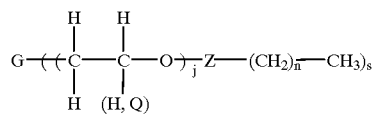

Formula 1 can be considered as describing molecules which have a central core (illustrated by "G"), with several arms of formula 2 (below) extending from the core.

2.

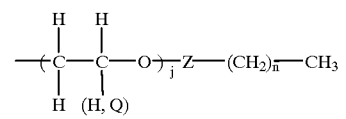

In referring to formulas 1 and 2, the label "Z" represents a segment of one or more atoms, j is an integer from 1 to about 300, Q is an alkyl or aryl group, and n is an integer greater than 1. Substituent Q can vary amongst different alkyl and aryl groups within any of the arms, and in particular embodiments Q is $CH_3$ throughout the arms. It is noted that the segment "Z" can include any of various multi-atom segments, including, for example, material 20.

20.

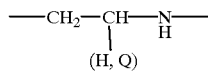

The central core "G" of formula 1 can be a single atom, or a group of atoms. The number of arms is determined by "s" of formula 1, and is preferably at least 2, and more preferably at least 3. Accordingly, "s" is an integer which is preferably at least 2, and more preferably at least 3. A reason for having at least two of the arms is to increase a hydrophobic character of formula 1 beyond that which would exist if less than two arms were used. The increased hydrophobic character can improve solubility of formula 1 within phase change ink materials (which are generally waxy and hydrophobic), and can thus improve dispersal of the compound within the phase change ink materials.

In preferred aspects of the invention, the formula 1 materials are limited to colorless compounds. The term "colorless" is utilized to indicate compounds which do not absorb light from the visible wavelength spectrum (i.e., from about 400 nanometers to about 750 nanometers). Colorless compounds are preferred as such can be readily utilized as additives in existing phase change ink compositions. Specifically, the colorless compounds should not alter the colors of the existing ink compositions when added thereto. Although the formula 1 materials are limited to colorless compounds in preferred aspects of the invention, it is to be understood that the formula 1 materials, can, in less preferred aspects of the invention, be colored compounds. Specifically, it is recognized that toughening agents can be formed which absorb light from the visible wavelength spectrum. Such toughening agents could, for example, be cyan, magenta, yellow or black.

A specific sub-class of the materials represented by formula 1 is shown below as formula 3. In such subclass, the integer "s" of formula 1 is 3, and the central core "G" is a multi-atom segment.

3.

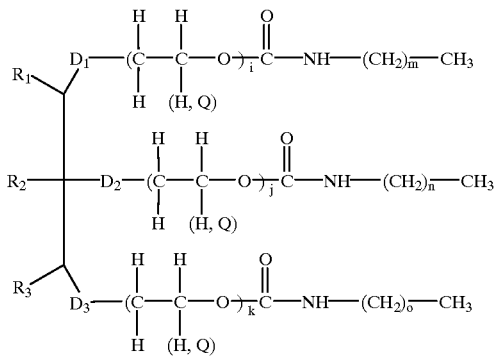

In referring to formula 3, "i", "j" and "k" are integers from 1 to about 50, and can be the same or different than one another; "Q" is an alkyl or aryl group and can vary amongst different alkyl and aryl groups within a compound encompassed by formula 3; "m", "n" and "o" are integers greater than 13, and can be the same or different than one another; $R_1$, $R_2$ and $R_3$ can comprise one or both of hydrogen and carbon, and can be the same or different than one another; and $D_1$, $D_2$ and $D_3$ comprise one or more atoms. Further, two or more of $R_1$, $R_2$ and $R_3$ can be comprised by a common ring. The use of the symbol "(H, Q)" at a position indicates that either hydrogen or a group "Q" can be at the position. The groups $R_1$, $R_2$ and $R_3$ can be hydrogen atoms, or can be, for example, aryl or alkyl groups.

In particular embodiments of the present invention, $D_1$, $D_2$ and $D_3$ of formula 3 are oxygen atoms; "i", "j" and "k" are equal to one another; and $R_1$, $R_2$ and $R_3$ are hydrogen atoms. The resulting class of compounds is represented by formula 4.

4.

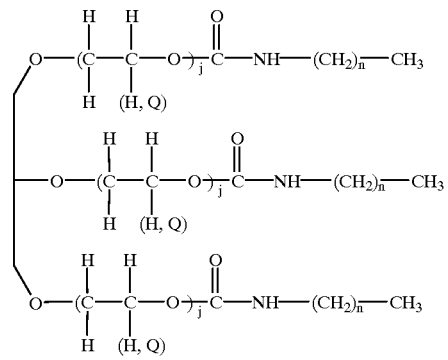

Materials encompassed by formula 4 can be synthesized utilizing the methodology shown in the FIGURE. Specifically, compounds encompassed by formula 4 can be formed from the reactants ARCOL POLYOL LHT-112™ (CAS[25791-96-2]; 1,2,3-propanetriol polymer with methyl oxirane), and $CH_3$—$(CH_2)_n$—NCO in the presence of a catalyst comprising dibutyltindilaurate (CAS[77-58-7]). The catalyst is typically present to a concentration of less than 1%, by weight.

The material $CH_3$—$(CH_2)_n$—NCO is preferably the limiting reagent in the reaction shown in the FIGURE, and can comprise, for example, MONDUR O™ (octadecylisocyanate (CAS[112-96-9])/hexadecylisocyanate (CAS[1943-84-6]).)

It is noted that formula 4 is but one method of describing the compounds formed by the reaction of the FIGURE, and that a more general description of such compounds is represented by formula 5.

5.

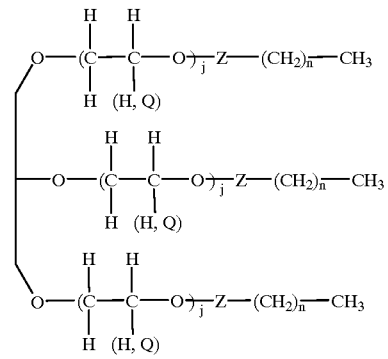

The segment "Z" of formula 5 comprises the amide linkage of formula 4. Formula 5 is utilized to indicate that other linkages can be substituted for the amide linkage of formula 4 to form colorless compounds of the present invention.

It is also noted that formulas 4 and 5 describe specific materials encompassed by the class described above as formula 3, and that other colorless materials are encompassed by formula 3. Such other materials can be formed by the reaction scheme of the FIGURE if the shown ARCOL™ polyol is replaced with a material having the formula shown below as formula 7.

7.

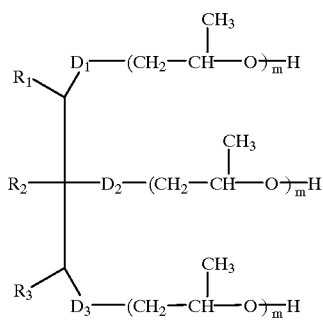

In formula 7, $R_1$, $R_2$, and $R_3$ comprise at least one of carbon and hydrogen, and at least one of $R_1$, $R_2$, and $R_3$ can be a segment selected from the group consisting of alkyl and aryl groups. The groups $D_1$, $D_2$ and $D_3$ of formula 7 can comprise one or more atoms, and in particular embodiments are oxygen atoms.

Another general category of toughening agent encompassed by the present invention is described by formula 8.

8.

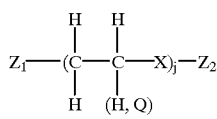

The substituent X of formula 8 indicates a single atom, and can be, for example, O or N. The substituents $Z_1$ and $Z_2$ of formula 8 comprise one or more atoms, can be the same as one another or different from one another, and can be comprised within a common ring (i.e., can together form a cyclic structure). The label j of formula 8 is an integer that is preferably from 1 to about 50, and the representation of "(H, Q)" indicates that either a group Q or a hydrogen can be in the shown positions of formula 8. The group Q can be either an alkyl group or an aryl group, and can vary amongst different alkyl and aryl groups within a compound encompassed by formula 8.

A specific class of compounds encompassed by formula 8 is described by formula 9.

9.

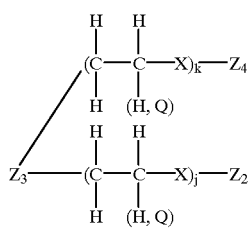

In formula 9, $Z_3$ and $Z_4$ are substituents comprising one or more atoms. The label k of formula 9 is an integer that is preferably from 1 to about 50, and which can be the same as, or different from j.

A more specific class of compounds encompassed by formulas 8 and 9 is described by formula 10.

10.

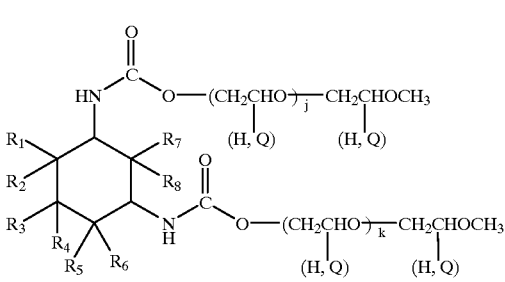

The components $R_1$, $R_2$, $R_3$, $R_4$, $R_5$, $R_6$, $R_7$ and $R_8$ of formula 10 can be, for example, selected from the group consisting of hydrogen, halogens, hydroxy groups, alkoxy groups, trifluoromethyl groups, and alkyl groups, and can be the same as one another or different than one another. Further two or more of the components $R_1$, $R_2$, $R_3$, $R_4$, $R_5$, $R_6$, $R_7$ and $R_8$ of formula 10 can be comprised within a common ring.

Yet a more specific class of compounds encompassed by formulas 8 and 9 is described by formula 11.

11.

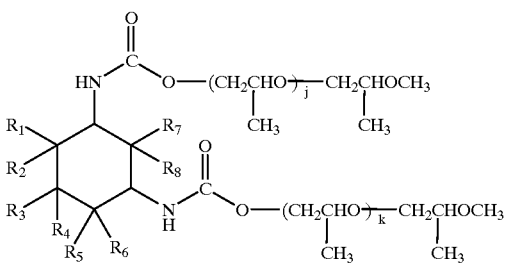

The components $R_1$, $R_2$, $R_3$, $R_4$, $R_5$, $R_6$, $R_7$ and $R_8$ of formula 11, like those of formula 10, can be, for example, selected from the group consisting of hydrogen, halogens, hydroxy groups, alkoxy groups, trifluoromethyl groups, and alkyl groups, and can be the same as one another or different than one another. Further two or more of the components $R_1$, $R_2$, $R_3$, $R_4$, $R_5$, $R_6$, $R_7$ and $R_8$ of formula 11 can be comprised within a common ring.

Another specific class of compounds encompassed by formulas 8 and 9 is described by formula 12.

12.

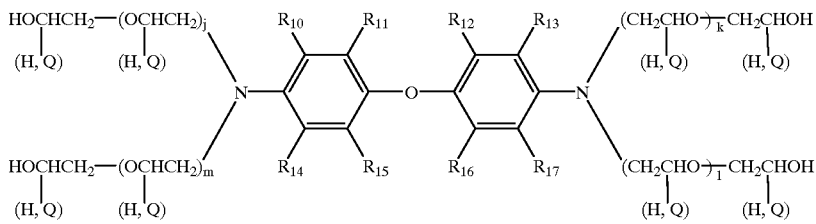

The components $R_{10}$, $R_{11}$, $R_{12}$, $R_{13}$, $R_{14}$, $R_{15}$, $R_{16}$, and $R_{17}$ of formula 12 can be, for example, selected from the group consisting of hydrogen, halogens, hydroxy groups, alkoxy groups, trifluoromethyl groups, and alkyl groups, and can be the same as one another or different than one another. Further, two or more of the components $R_{10}$, $R_{11}$, $R_{12}$, $R_{13}$, $R_{14}$, $R_{15}$, $R_{16}$, and $R_{17}$ of formula 12 can be within a common ring. The labels j, k, l and m of compound 12 are preferably integers from 1 to about 50, and can be the same as, or different from, one another.

Toughening compounds of the present invention (i.e. materials described by one more of formulas 1–12) can be incorporated into phase change inks by incorporating the materials in an ink to a concentration of from about 0.5% to about 50% (by weight). The resulting phase change ink will preferably be a solid at room temperature, and specifically will preferably be a solid at temperatures below about 30° C. Further, such phase change ink will preferably melt at a temperature above 30° C. (typically much higher than 30° C.) so that the inks can be jetted through a printhead and onto a substrate. An exemplary operating temperature of a printhead of a phase change ink printing device is about 140° C. Accordingly, a preferred phase change ink will have a melting temperature of at or below 140° C.

Phase change inks encompassed by the present invention can be utilized in printing applications by melting at least a portion of a solid block of the ink to transform such portion to a liquid phase. The liquid phase ink can then be jetted through a printhead and applied onto a substrate. Once on the substrate, the ink can be cooled to form an ink pattern which defines at least a portion of a visible image on the substrate. It has been found that the incorporation of toughening agents encompassed by the present invention (i.e. materials described by one more of formulas 1–12) can reduce the brittleness and accordingly improve durability of inks relative to a brittleness and durability which would exist if the toughening agents were not incorporated into the inks, and that such reduction in brittleness (and improvement in durability) can be accomplished by the toughening agents of the present invention without increasing a coefficient of friction of the phase change ink beyond that which would exist in the absence of the toughening agent.

EXAMPLES

Example 1
(Unithox Colorless Resin)

A quantity of C-50 linear alcohol ethoxylate[1] (1894.9 grams (1.06 moles)) was placed in a 300 mL four-neck resin kettle equipped with a Trubore stirrer. The C-50 linear alcohol ethoxylate was heated to 140° C. under an $N_2$ atmosphere, and agitation of the linear alcohol was started as the material became molten (at approx. 100° C.). The molten C-50 linear alcohol ethoxylate was stirred and heated at 140° C. for about 1 hour in order to remove water. A vacuum was then applied to the kettle at 140° C. for about 1 hour to remove additional moisture. The nitrogen atmosphere was then re-introduced and about 0.60 grams of dibutyltindilaurate[2] was added. About 115.0 grams (0.52 moles) isophorone diisocyanate[3] was then added to the kettle in approximately 2 minutes. The reaction mixture exothermed to about 150° C., and was held at this temperature for about 2 hours. Fourier transform infrared spectroscopy (FT-IR) of the reaction product confirmed that all of the NCO functionality was consumed. Specifically, FT-IR of the product revealed the absence (disappearance) of a peak at ~2285cm$^{-1}$ (NCO) and the appearance (or increase in magnitude) of peaks at ~1740 . 1680cm$^{-1}$ and ~1540–1530cm$^{-1}$ corresponding to urethane frequencies. The urethane product was then poured into aluminum molds and allowed to cool and harden. The product was a solid at room temperature characterized by a viscosity of about 69.1 cPs as measured by a Ferranti-Shirley cone-plate viscometer at about 140° C.; and a $T_g$ (glass transition temperature) of about −42.5° C. as measured by Differential Scanning Calorimetry using a DuPont 2100 calorimeter at a scan rate of 20° C./minute.

[1] UNITHOX 750-C-50 linear alcohol ethoxylate available from Baker Petrolite of Tulsa. Okla.
[2] FASCAT 4202-dibutyltindilaurate available from Elf Atochem North America, Inc. of Philadelphia, Pa.
[3] Desmodur I-Isophorone diisocyanate available from Bayer Corp. of Pittsburgh, Pa.

Example 2
(Colorless Material)

About 70.0 grams (0.34 moles) of tripropylene glycol monomethyl ether[4] and about 37.7 grams (0.17 moles) isophorone diisocyanate[5] were placed in a 200 mL beaker equipped with a magnet. The beaker was then heated to 115° C. utilizing a silicon oil bath. Three drops of catalyst (Fascat 4202)[6] were then added, and the mixture allowed to react for 2 hours at 115° C. An FT-IR of the reaction product indicated that all of the NCO functionality was consumed. Specifically, the FT-IR showed the absence (disappearance) of a peak at ~2285cm$^{-1}$ (NCO) and the appearance (or increase in magnitude) of peaks at ~1740–1680cm$^{-1}$ and ~1540–1530cm$^{-1}$ corresponding to urethane frequencies. The final urethane product was then poured into a specimen jar and allowed to cool. This final product was a liquid at room temperature characterized by a viscosity of about 14.6 cPs as measured by a Ferranti-Shirley cone-plate viscometer at about 135° C.

[4] Tripropylene glycol monomethyl ether available from Aldrich Chemicals of Milwvaukee, Wis.
[5] Desmodur I-Isophorone diisocyanate available from Bayer Corp. of Pittsburgh, Pa.
[6] FASCAT 4202-dibutyltindilaurate available from Elf Atochem North America, Inc. of Philadelphia, Pa.

Example 3
(Colorless Wax)

About 90.0 grams (0.045 moles) or polypropylene glycol 2000 (PPG 2000)[7] and about 26.6 grams (0.09 moles) octadecyl isocyanate[8] were placed in a 200 mL beaker having a magnet therein. The beaker was then heated to 115° C. utilizing a silicone oil bath. Three drops of catalyst (Fascat 4202)[9] were added and the mixture allowed to react for 2 hours at 115° C. An FT-IR of the reaction product showed the absence (disappearance) of a peak at ~2285cm$^{-1}$ (NCO) and the appearance (or increase in magnitude) of peaks at ~1740–1680cm$^{-1}$ and ~1540–1530cm$^{-1}$ corresponding to urethane frequencies. The final urethane product was then poured into a specimen jar and allowed to cool and harden. This final produce was a viscous semisolid at room temperature characterized by a viscosity of about 15.5 cPs as measured by a Ferranti-Shirley cone-plate viscometer at about 135° C.; and a melting point of about 1.8° C. as measured by Differential Scanning Calorimetry using a DuPont 2100 calorimeter at a scan rate of 20° C./minute.

[7] Polypropylene glycol 2000 available from Aldrich Chemicals of Milwaukee, Wis.
[8] Mondur O-Octadecyl Isocyanate available from Bayer Corp. of Pittsburgh, Pa.
[9] FASCAT 4202-dibutyltindilaurate available from Elf Atochem North America, Inc. of Philadelphia, Pa.

Example 4

(Colorless Wax)

About 80.0 grams (0.052 moles) of ARCOL LHT 112[10] and about 46.6 grams (0.156 moles) octadecyl isocyanate[11] were placed a 200 mL beaker with a magnet and heated to 115° C. with a silicone oil bath. Five drops of catalyst (Fascat 4202)[12] were added and the mixture allowed to react for 2 hours at 115° C. An FT-IR of the reaction product showed the absence (disappearance) of a peak at ~2285cm$^{-1}$ (NCO) and the appearance (or increase in magnitude) of peaks at ~1740–1680cm$^{-1}$ and ~1540–1530cm$^{-1}$ corresponding to urethane frequencies. The final urethane product was then poured into a specimen jar and allowed to cool and harden. This final product was a solid at room temperature characterized by a viscosity of about 15.8 cPs as measured by a Ferranti-Shirley cone-plate viscometer at about 135° C.; and a melting point of about 23.8° C. as measured by a Differential Scanning Calorimetry using a DuPont 2100 calorimeter at a scan rate of 20° C./minute.

[10] ARCOL LHT-glycerol propoxylate available from ARCO Chemical Co. of Newtown Square, Pa.
[11] Mondur O-Octadecyl Isocyanate available from Bayer Corp. of Pittsburgh, Pa.
[12] FASCAT 4202-dibutyltindilaurate available from Elf Atochem North America, Inc. of Philadelphia, Pa.

Example 5

(Cyan Ink)

About 217 grams of urethane resin from Example 1 of U.S. patent application Ser. No. 09/023,366 (Tektronix Docket 6224 US 3), 254 grams of the urethane resin from Example 1 above (Unithox Colorless Resin) ("Unithox" resin), 313 grams of the resin from Example 1 of U.S. Pat. No. 5,783,658 ("Abitol" resin), 561 grams of Witco S-180 stearyl stearamide wax[13], 561 grams of polyethylene wax[14] and 4.0 grams of Uniroyal Naugard 445 antioxidant[15] were combined in a stainless steel beaker. The materials were melted for about 3 hours at 125° C. in an oven, then blended by stirring in a temperature controlled mantle for ½ hour at 125° C. To the molten ink base was added 121.8 grams of the cyan wax from Example 4 of U.S. Pat. No. 5,919,839. The resulting cyan ink was stirred for an additional 2 hours at 125° C. The ink was then filtered through a heated (125° C.) Mott apparatus (available from Mott Metallurgical) using Whatman #3 paper at 5 psi, poured into molds, and allowed to solidify to form ink sticks. This final cyan ink product was characterized by a viscosity of about 12.9 cPs at 135° C. as measured by a Ferranti-Shirley cone-plate viscometer; and two melting points at about 86° C. and 98° C. as measured by differential scanning calorimetry using a DuPont 2100 calorimeter. The spectral strength of this ink was measured in n-butanol as about 1645 (milliliters*Absorbance Units/gram) at a lambda$_{max}$ of 670 nm utilizing a Perkin-Elmer Lambda 25 UV/VIS spectrophotometer.

[13] Kemamide S-180-Stearyl Stearamide available from Witco Chemical Co. of Memphis, Tenn.
[14] Polywax 850-available from Petrolite Corp. of Tulsa, Okla.
[15] Naugard 445-Antioxidant available from Uniroyal Chemical Co. of Oxford, CT, Stepan Co., Northfield, Ill.

Example 6

(Clear Ink Base)

About 399 grams of urethane resin from Example 1 of U.S. patent application Ser. No. 09/023,366 (Tektronix Docket 6224 US 3), 469 grams of the urethane resin from Example 1 above (Unithox Colorless Resin), 574 grams of the resin from Example 1 of U.S. Pat. No. 5,783,658 ("Abitol" resin), 1029 grams of Witco S-180 stearyl stearamide wax[16], 1029 grams of polyethylene wax[17] and 7.0 grams of Uniroyal Naugard 445 antioxidant[18] were combined in a stainless steel beaker. The materials were then melted for about 8 hours at 125° C. in an oven, and blended by stirring in a temperature controlled mantle for ½ hour at 125° C. The resulting ink base was filtered through a heated (125° C.) Mott apparatus (available from Mott Metallurgical) using Whatman #3 paper at 5 psi. The ink base was then poured into molds and allowed to solidify to form ink sticks.

[16] Kemamide S-180-Stearyl Stearamide available from Witco Chemical Co. of Memphis, Tenn.
[17] Polywax 850 available from Petrolite Corp. of Tulsa, Okla.
[18] Naugard 445 Antioxidant available from Uniroyal Chemical Co. of Oxford, CT, Stepan Co., Northfield, Ill.

Example 7

(Black Ink)

About 910 grams of the clear ink base from Example 6, 60 grams of the material from Example 2, and 30 grams of Solvent Black 45[19] were combined in a stainless steel beaker. The materials were melted for about 8 hours at 125° C. in an oven, then blended by stirring in a temperature controlled mantle for ½ hour at 125° C. To the resulting molten ink base was added an additional 65 grams of S-180 wax[20] and an additional 65 grams of polyethylene wax[21]. The resulting black ink was stirred for an additional 2 hours at 125° C., filtered through a heated (125° C.) Mott apparatus (available from Mott Metallurgical) using Whatman #3 paper at 5 psi, poured into molds, and allowed to solidify to form ink sticks. The final black ink product was characterized by the following physical properties: viscosity of about 12.9 cPs at 135° C. as measured by a Ferranti-Shirley cone-plate viscometer; two melting points at about 86 and 98° C. as measured by differential scanning calorimetry using a DuPont 2100 calorimeter; and a $T_g$ of about 1.4° C. as measured by Dynamic Mechanical Analysis using a Rheometrics Solids Analyzer (RSAII).

[19] Solvent Black 45-Dye available from Clariant Corp. of Charlotte, N.C.
[20] Kemamide S-180-Stearyl Stearamide available from Witco Chemical Co. of Memphis, Tenn.
[21] Polywax 850-available from Petrolite Corp. of Tulsa, Okla.

Example 8

(Black Ink)

About 910 grams of the ink base from Example 6, 60 grams of the material from Example 3, and 30 grams of Solvent Black 45[22] were combined in a stainless steel beaker. The materials were melted for about 8 hours at 125° C. in an oven, then blended by stirring in a temperature controlled mantle for ½ hour at 125° C. To the molten ink base was added an additional 30 grams of S-180 wax[23] and an additional 30 grams of polyethylene wax[24]. The black ink was then stirred for an additional 2 hours at 125° C. The ink was then filtered through a heated (125° C.) Mott apparatus (available from Mott Metallurgical) using Whatman #3 paper at 5 psi, poured into molds, and allowed to solidify to form ink sticks. The final black ink product was characterized by the following physical properties: viscosity of about 13.0 cPs at 135° C. as measured by a Ferranti-Shirley cone-plate viscometer; two melting points at about 86° C. and 98° C. as measured by differential scanning calorimetry using a DuPont 2100 calorimeter; and a $T_g$ of about 0° C. as measured by Dynamic Mechanical Analysis using a Rheometrics Solids Analyzer (RSAII).

[22] Solvent Black 45-Dye available from Clariant Corp. of Charlotte, N.C.
[23] Kemamide S-180-Stearyl Stearamide available from Witco Chemical Co. of Memphis, Tenn.
[24] Polywax 850-available from Petrolite Corp. of Tulsa. Okla.

Example 9

(Black Ink)

About 910 grams of the ink base from Example 6, 60 grams of the material from Example 4, and 30 grams of Solvent Black 45[25] were combined in a stainless steel beaker The materials were melted for about 8 hours at 125° C. in an oven, then blended by stirring in a temperature controlled mantle for ½ hour at 125° C. To the molten ink base was added an additional 62 grams of S-180 wax[26] and an additional 62 grams of polyethylene wax[27]. The black ink was then stirred for an additional 2 hours at 125° C. The ink was then filtered through a heated (125° C.) Mott apparatus (available from Mott Metallurgical) using Whatman #3 paper at 5 psi. The ink was then poured into molds and allowed to solidify to form ink sticks. The final black ink product was characterized by the following physical properties: viscosity of about 12.9 cPs at 135° C. as measured by a Ferranti-Shirley cone-plate viscometer; two melting points at about 86° C. and 98° C. as measured by differential scanning calorimetry using a DuPont 2100 calorimeter; and a $T_g$ of about 2.4° C. as measured by Dynamic Mechanical Analysis using a Rheometrics Solids Analyzer (RSAII).

[25] Solvent Black 45-Dye available from Clariant Corp. of Charlotte, N.C.
[26] Kemamide S-180-Stearyl Stearamide available from Witco Chemical Co. of Memphis, Tenn.
[27] Polywax 850-available from Petrolite Corp. of Tulsa, Okla.

Example 10

(Black Ink With No Plasticizer)

About 240 grams of urethane resin from Example 1 of U.S. patent application Ser. No. 09/023,366 (Tektronix Docket 6224 US 3), 224 grams of the urethane resin from Example 4 above ("Unithox" resin), 309 grams of the resin from Example 1 of U.S. Pat. No. 5,783,658 ("Abitol" resin), 566 grams of Witco S-180 stearyl stearamide wax[28], 566 grams of polyethylene wax[29] and 4.0 grams of Uniroyal Naugard 445 antioxidant[30] were combined in a stainless steel beaker. The materials were melted for about 3 hours at 125° C. in an oven, then blended by stirring in a temperature controlled mantle for ½ hour at 125° C. To the molten ink base was added 54 grams of Solvent Black 45[31]. The ink was then stirred for an additional 2 hours at 125° C., and subsequently filtered through a heated (125° C.) Mott apparatus (available from Mott Metallurgical) using Whatman #3 paper at 5 psi. The ink was then poured into molds and allowed to solidify to form ink sticks. Th final black ink product was characterized by the following physical properties: viscosity of about 13.1 cPs at 135° C. as measured by a Ferranti-Shirley cone-plate viscometer; two melting points at about 87 and 100° C. as measured by differential scanning calorimetry using a DuPont 2100 calorimeter; and a $T_g$ of about 25° C. as measured by Dynamic Mechanical Analysis using a Rheometrics Solids Analyzer (RSAII).

[28] Kemamide S-180-Stearyl Stearamide available from Witco Chemical Co. of Memphis, Tenn.
[29] Polywax 850-available from Petrolite Corp. of Tulsa, Okla.
[30] Naugard 445-Antioxidant available from Uniroyal Chemical Co. of Oxford, CT, Stepan Co., Northfield, Ill.
[31] Solvent Black 45-Dye available from Clariant Corp. of Charlotte, N.C.

TESTING OF THE INKS FROM EXAMPLES 1–10

Three different tests were employed to measure the advantageous properties of new inks encompassed by the present inventions. The results are listed in Table 1, and brief descriptions of the methods utilized in the tests are as follows.

Gouge resistance is a measure for the ink fuse grade, and can be a measure of ink durability. Specifically, gouge resistance measures how well an ink adheres to media (a measure of ink adhesion), and how well the ink adheres to itself (a measure of the cohesive strength of the ink, or its toughness). Gouge resistance was measured with a Variable Weight Gouge Tester (VWGT), developed by Tektronix, Inc. In preparation for the test, solid-fill prints of the inks listed in Table 1 were generated using a Tektronix Phaser 840™ Ink Jet Printer. In all cases, drum temperature and preheat temperature were set to 60° C. The print to be tested was affixed to the surface of a flat table capable of smooth linear motion with a defined speed. Before starting the test, the tester applied defined, but different normal loads to three surface spots of the print through metal gouger fingers. After initiation of the test, the table with the print moved, and the stationary gouger fingers removed ink from its surface along three parallel linear pathways. Using an electronic scanner (Hewlett-Packard SCANJET 3c™), the total area of removed ink was measured. Its value (given in $mm^2$ in Table 1) is inversely proportional to the cohesive strength or toughness of the ink. Therefore, when comparing prints of two inks, the tougher and more durable ink is indicated by a smaller "Gouge Number" (area of ink removed).

Foldability testing is yet another way to characterize the durability of a printed ink by measuring crack failure resistance during folding. The tests used solid-fill prints of the inks listed in Table 1, generated in the above mentioned way, which were machine-folded with a Duplo D-590L Paper Folder. The prints were then unfolded, cleaned from dust, and scanned as described above. As a result of this procedure, the fold Failure Area was measured, which is the amount of white which results when the print is folded. From this, the Mean Crack Width (in inches)—reported as "Fold Number" in Table 1—is calculated by dividing Fold Failure Area by the length of the scan. As in the case of Gouge Resistance, smaller numbers characterize tougher and more durable inks.

Coefficients of friction (COF) against glass were measured on a Model 225-1 horizontal plane Friction/Peel Tester from Thwing-Albert Instrument Company, Philadelphia (Pennsylvania), interfaced to a PC running "Talas" 3.0 software—also marketed by Thwing-Albert Instrument Company. In preparation of the test, quadratic samples measuring 2.5" by 2.5" were cut from solid-fill prints of the inks from Table 1, generated in the above mentioned way, and attached face-down to the lower part of the friction tester sled using two strips of double-stick tape. The sled had a weight of 200 grams. As a stationary counterpart, a ⅛" thick tempered soda-lime glass plate, measuring 21.5" by 7.5" was attached to the surface of the horizontal plane of the tester, using a silicon-rubber padded clamp. All measurements were done at room temperature. In further conducting the testing routine, the sled with the attached print was connected to the load cell of the instrument (maximum capacity 2 kg), using a Nylon string. Maintaining a slight tension in the Nylon string, the sled and attached sample were brought into contact to the horizontal glass surface, and data acquisition was initiated. During the test, the instrument dragged the print surface over the glass plate for 10 seconds with a speed of 2" /min. Toward completion of the process, the sled was lifted vertically from the glass surface, the load cell was brought back to the initial position, and the sample was set down again before starting the next data acquisition cycle. Five such cycles were measured consecutively with each sample, and data were logged.

The friction tester and software enable drag force to be monitored as a function of time, and further enable a statistical evaluation of measurement results to be performed. Generally, the coefficient of (sliding) friction is defined as the ratio of this drag force to the normal force (weight) of the sliding object. Since the tester represents a horizontal assembly, and since the weight of the object (the sled with the attached sample) and its sliding speed are known, the coefficient of (sliding) friction as a function of sled displacement can be deduced. It is known in the art that static and kinetic COF should be distinguished. The Thwing-Albert Friction/Peel Tester is able to measure both COF. In particular, the kinetic COF—as reported in Table 1—is defined as the resistance to be overcome in order to maintain sliding movement, with lower numbers indicating smaller resistance. For reasons of experience and convenience, the kinetic COF is taken to be the average of the global averages of the mentioned five measurements.

When considered together, the data of Table 1 show that inks comprising the three-armed "Arcol" based material as a plasticizer and toughener (see, for example, the ink of Example 9) can have low coefficients of friction while having good resistance to folding and gouging inflicted damage.

TABLE 1

| Ink Type | Gouge Number | Fold Number | Dynamic COF |
| --- | --- | --- | --- |
| Cyan ink of Example 5 | 610 mm² | 0.0031 in. | 0.47 |
| Black ink of Example 10 | 1898 mm² | 0.0169 in. | 0.56 |
| Black ink of Example 7 | 257 mm² | 0.0067 in. | 0.67 |
| Black ink of Example 8 | 185 mm² | 0.0044 in. | 0.56 |
| Black ink of Example 9 | 224 mm² | 0.0051 in. | 0.48 |

What is claimed is:

1. A solid ink comprising:

a colorant; and a colorless compound comprising

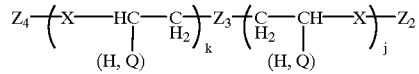

wherein X is a single atom corresponding to N or O; wherein $Z_0$ and $Z_4$ are substituents comprising one or more atoms; wherein $Z_2$, $Z_3$ and $Z_4$ can be the same as one another or different from one another; wherein $Z_2$, $Z_3$ and $Z_4$ can be within a common ring; wherein j is an integer from 1 to about 50;

and wherein k is an integer from 1 to about 50, and can be the same as or different from j; wherein the representation of "(H, Q)" indicates that either a group Q or a hydrogen can be in the shown positions; wherein the group Q is either an alkyl group or an aryl group; and wherein Q can vary amongst different alkyl and aryl groups within the compound.

2. A solid ink comprising:

a colorant; and a colorless compound comprising

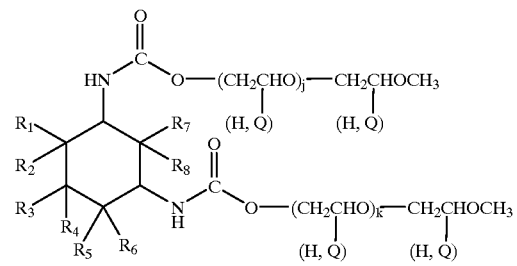

wherein the components $R_1$, $R_2$, $R_3$, $R_4$, $R_5$, $R_6$, $R_7$ and $R_8$ are selected from the group consisting of hydrogen, halogens, hydroxy groups, alkoxy groups, trifluoromethyl groups, and alkyl groups, can be the same as one another or different than one another, and two or more of the components $R_1$, $R_2$, $R_3$, $R_4$, $R_5$, $R_6$, $R_7$ and $R_8$ can be within a common ring; wherein the representation of "(H,Q)" indicates that either a group Q or a hydrogen can be in the shown positions; wherein the group Q is either an alkyl group or an aryl group; and wherein Q can vary amongst different alkyl and aryl groups within the colorless compound; and wherein k and j are integers from 1 to about 50, and can be the same or different from one another.

3. A solid ink comprising:

a colorant; and a colorless compound comprising

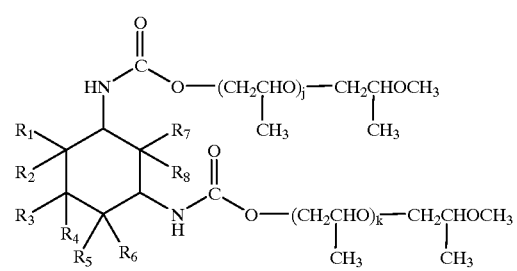

wherein the components $R_1$, $R_2$, $R_3$, $R_4$, $R_5$, $R_6$, $R_7$ and $R_8$ are selected from the hydrogen, halogens, hydroxy groups, alkoxy groups, trifluoromethyl groups, and alkyl groups, can be the same as one another or different than one another, and two or more of the components $R_1$, $R_2$, $R_3$, $R_4$, $R_5$, $R_6$, $R_7$ and $R_8$ can be within a common ring; and wherein k and j are integers from 1 to about 50, and can be the same as or different from one another.

4. A solid ink comprising:

a colorant; and a colorless compound comprising

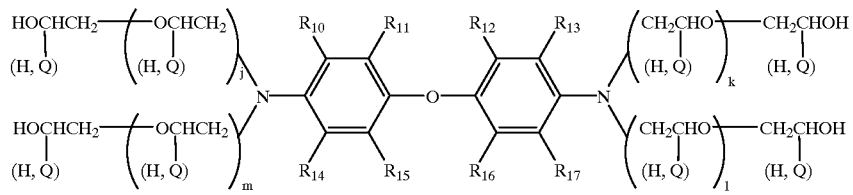

wherein the components $R_1$, $R_2$, $R_3$, $R_4$, $R_5$, $R_6$, $R_7$ and $R_8$ are selected from the hydrogen, halogens, hydroxy groups, alkoxy groups, trifluoromethyl groups, and alkyl groups, can be the same as one another or different than one another, and two or more of the components $R_{10}$, $R_{11}$, $R_{12}$, $R_{13}$, $R_{14}$, $R_{15}$, $R_{16}$, $R_{17}$ and can be within a common ring; wherein the representation of "(H, Q)" indicates that either a group Q or a hydrogen can be in the shown positions; wherein the group Q is either an alkyl group or an aryl group; and wherein Q can vary amongst different alkyl and aryl groups within the colorless compound; and wherein j, k, l and m are integers from 1 to about 50, and can be the same as or different from one another.

5. A solid ink comprising:

a colorant; and a colorless compound comprising a central core and at least two arms tending from the core, the at least two arms comprising the formula

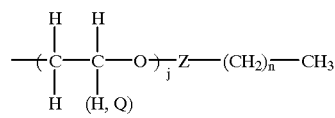

wherein Z is a segment of one or more atoms; wherein j is an integer from 1 to about 50 and can vary amongst the at least two arms; wherein the representation of "(H, Q)" at shown positions indicates that either a group Q or a hydrogen can be in the shown positions; wherein the group Q is either an alkyl group or an aryl group; wherein Q can vary amongst different alkyl and aryl groups within individual arms of the at least two arms; and wherein n is an integer greater than 1 and can vary amongst the at least two arms.

6. The solid ink of claim 5 wherein n is greater than 13 at each of the at least two arms.

7. The solid ink of claim 5 wherein the colorless compound comprises at least three of the arms.

8. The solid ink of claim 5 wherein Z comprises an amide bond.

9. The solid ink of claim 5 having the formula

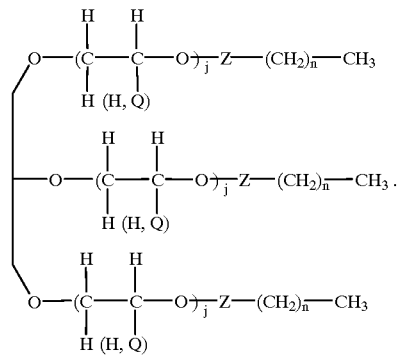

10. The solid ink of claim 5 having the formula

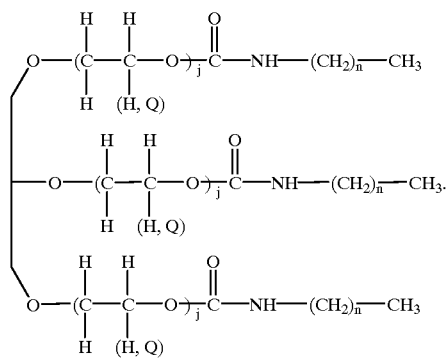

11. The solid ink of claim 5 having the formula

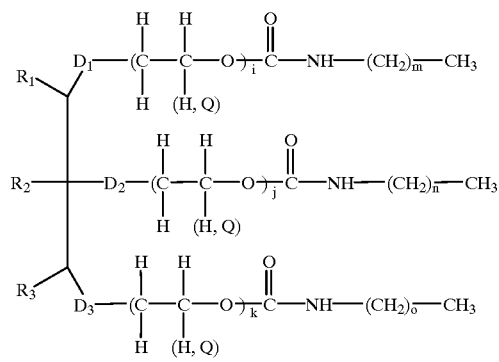

wherein i, j and k are integers from 1 to about 50, and can be the same or different than one another; wherein m, n and o are integers greater than 13, and can be the same or different than one another; and wherein $R_1$, $R_2$ and $R_3$ comprise hydrogen, and can be the same or different than one another, wherein two or more of $R_1$, $R_2$ and $R_3$ can be comprised by a common ring, and wherein $D_1$, $D_2$ and $D_3$ comprise one or more atoms.

12. The solid ink of claim 11 wherein $R_1$, $R_2$ and $R_3$ are hydrogen.

13. The solid ink of claim 11 wherein $R_1$, $R_2$ and $R_3$ comprise carbon.

14. The solid ink of claim 11 wherein $R_1$, $R_2$ and $R_3$ are aliphatic chains.

15. The solid ink of claim 11 wherein R1, $R_2$ and $R_3$ are alkyl chains.

16. A printing method comprising:
melting a phase change ink comprising a colorless compound comprising

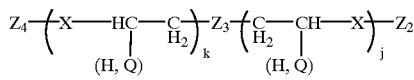

wherein X is a single atom corresponding to N or O; wherein $Z_3$ and $Z_4$ are substituents comprising one or more atoms; wherein $Z_2$, $Z_3$ and $Z_4$ can be the same as one another or different from one another; wherein $Z_2$, $Z_3$ and $Z_4$ can be within a common ring; wherein k and j are both integers from 1 to about 50, and can be the same as or different from one another; wherein the representation of "(H, Q)" indicates that either a group Q or a hydrogen can be in the shown positions; wherein the group Q is either an alkyl group or an aryl group; and wherein Q can vary amongst different alkyl and aryl groups within the compound;

applying the melted ink to a substrate; and
cooling the melted ink on the substrate.

17. A printing method comprising:
melting a phase change ink comprising a colorless compound comprising

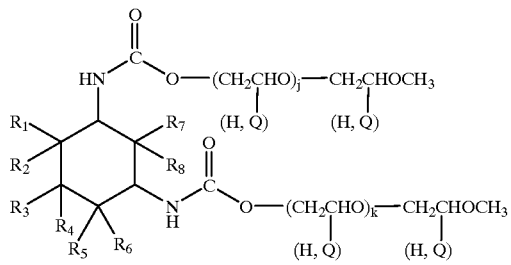

wherein the components $R_1$, $R_2$, $R_3$, $R_4$, $R_5$, $R_6$, $R_7$ and $R_8$ are selected from the group consisting of hydrogen, halogens, hydroxy groups, alkoxy groups, trifluoromethyl groups, and alkyl groups, can be the same as one another or different than one another, and two or more of the components $R_1$, $R_2$, $R_3$, $R_4$, $R_5$, $R_6$, $R_7$ and $R_8$ can be within a common ring; wherein the representation of "(H, Q)" indicates that either a group Q or a hydrogen can be in the shown positions; wherein the group Q is either an alkyl group or an aryl group; and wherein Q can vary amongst different alkyl and aryl groups within the colorless compound; and wherein k and j are integers from 1 to about 50, and can be the same as or different from one another;

applying the melted ink to a substrate; and cooling the melted ink on the substrate.

18. A printing method comprising:

melting a phase change ink comprising a colorless compound comprising

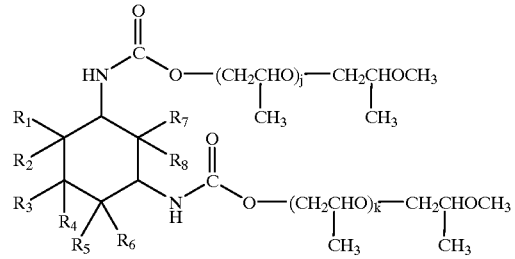

wherein the components $R_1$, $R_2$, $R_3$, $R_4$, $R_5$, $R_6$, $R_7$ and $R_8$ are selected from the group consisting of hydrogen, halogens, hydroxy groups, alkoxy groups, trifluoromethyl groups, and alkyl groups, can be the same as one another or different than one another, and two or more of the components $R_1$, $R_2$, $R_3$, $R_4$, $R_5$, $R_6$, $R_7$ and RB can be within a common ring; and wherein k and j are integers from 1 to about 50, and can be the same as or different from one another;

applying the melted ink to a substrate; and cooling the melted ink on the substrate.

19. A printing method comprising:

melting a phase change ink comprising a colorless compound comprising

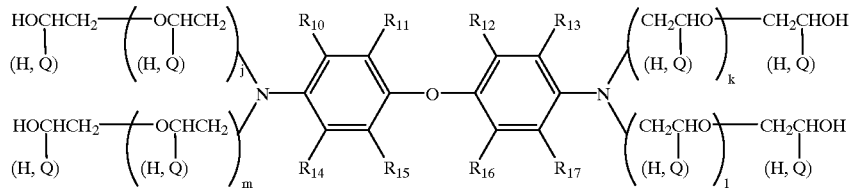

wherein the components $R_{10}$, $R_{11}$, $R_{12}$, $R_{13}$, $R_{14}$, $R_{15}$, $R_{16}$ and $R_{17}$ are selected from the group consisting of hydrogens, halogens, hydroxy groups, alkoxy groups, trifluoromethyl groups, and alkyl groups, can be the same as one another or different than one another, and two or more of the components $R_{10}$, $R_{11}$, $R_{12}$, $R_{13}$, $R_{14}$, $R_{15}$, $R_6$ and $R_{17}$ can be within a common ring; wherein the representation of "(H, Q)" indicates that either a group Q or a hydrogen can be in the shown positions; wherein the group Q is either an alkyl group or an aryl group; and wherein Q can vary amongst different alkyl and aryl groups within the colorless compound; and wherein j, k, l and m are integers from 1 to about 50, and can be the same as or different from one another;

applying the melted ink to a substrate; and cooling the melted ink on the substrate.

20. A printing method, comprising:

melting a phase change ink comprising a colorless compound comprising a central core and at least two arms extending from the core, the at least two arms comprising the formula

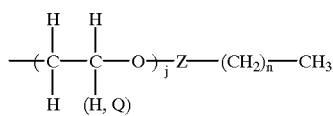

wherein Z is a segment of one or more atoms; wherein j is an integer from 1 to about 50 and can vary amongst the at least two arms; wherein the representation of "(H, Q)" indicates that either a group Q or a hydrogen can be in the shown positions; wherein the group Q is either an alkyl group or an aryl group; wherein Q can vary amongst different alkyl and aryl groups within individual arms of the at least two arms; and wherein n is an integer greater than 1 and can vary amongst the at least two arms;

applying the melted ink to a substrate; and cooling the melted ink on the substrate.

21. The method of claim 20 wherein the ink further comprises a colorant, and wherein the cooled ink forms at least a portion of a visible image on the substrate.

22. The method of claim 20 wherein n is greater than 13 at each of the at least two arms.

23. The method of claim 20 wherein Z comprises an amide bond.

24. The method of claim 20 wherein the colorless compound has the formula

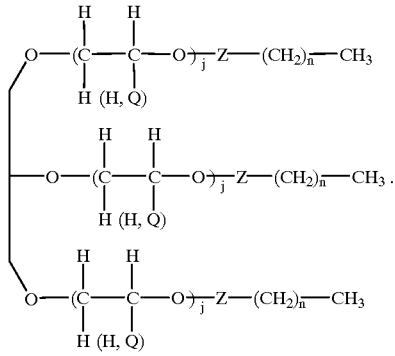

25. The method of claim 20 wherein the colorless compound has the formula

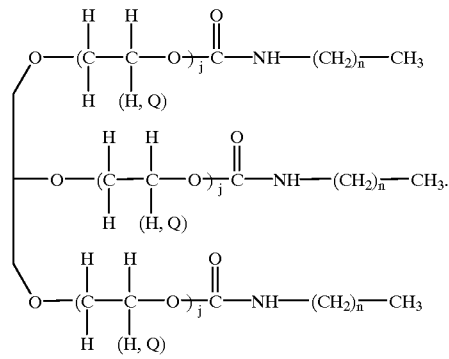

26. The method of claim 20 wherein the colorless compound has the formula

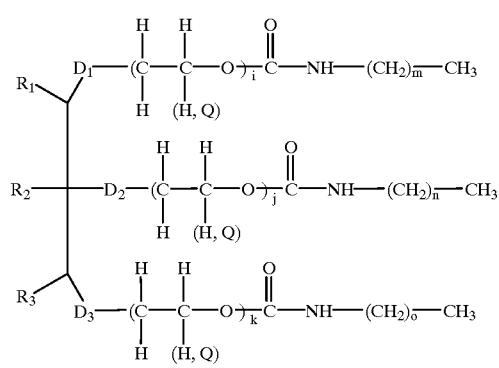

wherein i, j and k are integers from 1 to about 50, and can be the same or different than one another; wherein m, n and o are integers greater than 13, and can be the same or different than one another; and wherein $R_1$, $R_2$ and $R_3$ comprise hydrogen, and can be the same or different than one another, and wherein $D_1$, $D_2$ and $D_3$ comprise one or more atoms.

27. The method of claim 26 wherein $R_1$, $R_2$ and $R_3$ are hydrogen.

28. The method of claim 26 wherein $R_1$, $R_2$ and $R_3$ comprise carbon.

29. The method of claim 26 wherein $R_1$, $R_2$ and $R_3$ are aliphatic chains.

30. The method of claim 26 wherein at least one of $R_1$, $R_2$ and $R_3$ comprises either an alkyl group or an aryl group.

31. The method of claim 16 wherein $R_1$, $R_2$ and $R_3$ are alkyl chains.

* * * * *